(12) United States Patent
Lopez Gil et al.

(10) Patent No.: US 11,257,201 B2
(45) Date of Patent: Feb. 22, 2022

(54) COMPUTER-IMPLEMENTED METHOD AND SYSTEM FOR PREVENTING SIGHT DETERIORATION CAUSED BY PROLONGED USE OF ELECTRONIC VISUAL DISPLAYS IN LOW-LIGHT CONDITIONS

(71) Applicant: VISIONAPP SOLUTIONS, S.L., Aguilas (ES)

(72) Inventors: Norberto Lopez Gil, Aguilas (ES); Mateusz Tomasz Jaskulski, Aguilas (ES); Arthur Bradley, Aguilas (ES)

(73) Assignee: VISIONAPP SOLUTIONS, S.L., Aguilas (ES)

( * ) Notice: Subject to any disclaimer, the term of this patent is extended or adjusted under 35 U.S.C. 154(b) by 0 days.

(21) Appl. No.: 16/977,574

(22) PCT Filed: Feb. 15, 2019

(86) PCT No.: PCT/EP2019/053792
§ 371 (c)(1),
(2) Date: Sep. 2, 2020

(87) PCT Pub. No.: WO2019/166238
PCT Pub. Date: Sep. 6, 2019

(65) Prior Publication Data
US 2021/0012479 A1    Jan. 14, 2021

(30) Foreign Application Priority Data
Mar. 2, 2018   (ES) ............................... ES201830203

(51) Int. Cl.
*H04N 7/18*        (2006.01)
*G06T 7/00*        (2017.01)
(Continued)

(52) U.S. Cl.
CPC ........ *G06T 7/0002* (2013.01); *G06K 9/00228* (2013.01); *G08B 7/06* (2013.01);
(Continued)

(58) Field of Classification Search
CPC ............. H04N 5/2257; H04N 5/23245; H04N 19/124; H04N 5/235; H04N 5/238;
(Continued)

(56) References Cited

U.S. PATENT DOCUMENTS 10,264,266 B2 *   4/2019   Pan ...................... H04N 19/124
10,277,829 B1 *   4/2019   Garrido .............. H04N 5/23245
(Continued)

FOREIGN PATENT DOCUMENTS

WO      2015131647 A1    9/2015
WO      2018014960 A1    1/2018

OTHER PUBLICATIONS

Hiscocks et al., "Measuring Luminance with a Digital Camera", URL:http://www.ee.ryerson.ca/-phiscock/astronomy/light-pollution/luminance-notes-2.pdf, 2014, pp. 2-7.
(Continued)

*Primary Examiner* — Trang U Tran
(74) *Attorney, Agent, or Firm* — Lucas & Mercanti, LLP

(57) ABSTRACT

A system and method for preventing sight deterioration caused by prolonged use of electronic visual displays in low-light conditions is provided. The system includes a camera directed towards a user, a processing circuitry, control circuitry and, optionally, a light sensor. The processing circuitry determines the illuminance of a user's face, and in case it falls outside of a predefined range (putting the user at risk of future sight deterioration and progression of myopia), the device stores the illuminance data and/or sends a control signal to circuitry operative to notify the user. If processing circuitry determines that the illuminance is equal
(Continued)

or greater than the predefined illuminance, the circuitry operative can stop the notification. The notification can be modulated by any combination of the illuminance and the time of use.

20 Claims, 5 Drawing Sheets

(51) Int. Cl.
  *G06K 9/00* (2022.01)
  *G08B 7/06* (2006.01)
  *H04N 5/225* (2006.01)
  *G09G 5/10* (2006.01)

(52) U.S. Cl.
  CPC . *H04N 5/2257* (2013.01); *G06T 2207/30201* (2013.01); *G09G 5/10* (2013.01); *G09G 2320/0666* (2013.01); *G09G 2354/00* (2013.01); *G09G 2360/144* (2013.01)

(58) Field of Classification Search
  CPC ............ H04N 5/243; H04N 7/14; H04N 7/18; H04N 9/47; G06T 7/002; G06T 2207/30201; G06K 9/00228; G08B 7/06; G09G 5/10; G09G 2320/0666; G09G 2354/00; G09G 2360/144
  USPC .............................................. 348/77; 725/32
  See application file for complete search history.

(56) References Cited

U.S. PATENT DOCUMENTS

2011/0080421 A1   4/2011   Capener
2017/0047046 A1   2/2017   Tam

OTHER PUBLICATIONS

International Search Report and Written Opinion for Corresponding International Application No. PCT/EP2019/053792 (dated May 24, 2019) (13 Pages).
International Preliminary Report of Patentability for Corresponding International Application No. PCT/EP2019/053792 (dated Jun. 25, 2020) (30 Pages).

* cited by examiner

COMPUTER-IMPLEMENTED METHOD AND SYSTEM FOR PREVENTING SIGHT DETERIORATION CAUSED BY PROLONGED USE OF ELECTRONIC VISUAL DISPLAYS IN LOW-LIGHT CONDITIONS

CROSS REFERENCE TO RELATED APPLICATION

This Application is a 371 of PCT/EP2019/053792, filed Feb. 15, 2019, which claims the benefit of Spanish Patent Application No. P201830203, filed Mar. 2, 2018, each of which are incorporated herein by reference.

FIELD OF THE INVENTION

The present invention is related to the fields of visual optics, physiological optics, electronics and computers. In particular, the invention is related to systems and methods of preventing sight problems, such as myopia and ocular fatigue, which are caused by prolonged use of electronic screens in low-light conditions.

BACKGROUND OF THE INVENTION

Prolonged exposure to low-light conditions is particularly hazardous when the person is engaged in near viewing (e.g. reading). Both of which are commonplace in the modern world as people spend many hours each day indoors, viewing their personal electronic screens at close viewing distances. The prolonged use of electronic visual displays (such as the screen of a smartphone, a tablet or a personal computer) in low-light conditions causes sight problems, such as myopia and ocular fatigue. These vision problems develop in children and young adults who, compared to the previous generations, spend less time in high light level environments (performing outdoor activities).

Along with therapeutic methods to control myopia progression (pharmacological drugs to paralyze accommodation, multi-focal contact lenses, etc. [1]), spending time outdoors has been proven to reduce the rate of myopia progression [2], and to be correlated with reduced myopia prevalence in children [3], whereas high light levels have been reported to prevent myopia in animal models [4].

The present invention represents a solution highly practical for the modern and future society where every child and teenager owns an electronic device, allowing to prevent sight deterioration and myopia progression caused by their use in low-light conditions.

BIBLIOGRAPHIC REFERENCES

[1] Huang, J., Wen, D., Wang, Q., McAlinden, C., Flitcroft, I., Chen, H., . . . & Hu, L. (2016). Efficacy comparison of 16 interventions for myopia control in children: a network meta-analysis. Ophthalmology, 123(4), 697-708.

[2] Gwiazda, J., Deng, L., Manny, R., & Norton, T. T. (2014). Seasonal variations in the progression of myopia in children enrolled in the correction of myopia evaluation trial. Investigative ophthalmology & visual science, 55(2), 752-758.

[3] Wu, L. J., You, Q. S., Duan, J. L., Luo, Y. X., Liu, L. J., Li, X., . . . & Jonas, J. B. (2015). Prevalence and associated factors of myopia in high-school students in Beijing. PLoS One, 10(3), e0120764.

[4] Smith, E. L., Hung, L. F., & Huang, J. (2012). Protective effects of high ambient lighting on the development of form-deprivation myopia in rhesus monkeys. Investigative ophthalmology & visual science, 53(1), 421-428.

SUMMARY OF THE INVENTION

The present invention refers to a system and method for preventing sight deterioration caused by spending prolonged periods of time viewing the screen of an electronic device at close distance and under low-light conditions. The solution proposed herein makes use of the following components of the electronic device itself: a front camera and a processing circuitry to process the information. A light sensor can also be included for calibration. These hardware elements are present in the vast majority of the current portable electronic devices (smartphones and tablets).

A system can include an electronic screen driven by control circuitry and coupled with processing circuitry. If the processing circuitry determines that the illuminance of the user's face is lower than a threshold value defined by certain criteria, it can send a control signal to control circuitry to notify the user, or store the signal in memory for further processing by the user or a third party (the invention provides a mechanism for individuals to monitor their own light exposure levels or that of another person).

The invention to control myopia progression described herein monitors the light levels to which the user is exposed by measuring the light being reflected from their face as they employ the electronic device. In some embodiments, the control circuitry of the device can notify the user when the processing circuitry determines that a certain quantification of light exposure accumulated over time falls below a certain criterion, for example if a time averaging of the user's face illumination is below a certain threshold value. When appropriate, the user can be notified by the device to increase the room illumination, move to a more illuminated area, or take a break. If the processing circuitry determines that said illumination is equal or greater than a certain value, the control circuitry can stop notifications or not initiate them.

In some embodiments, the control circuitry included in the device can modify the operation of the electronic screen based on a relation between the measured illumination and a predetermined value. For example, if the device is being used in low-light conditions, which the processing circuitry determines to put the user at risk of sight deterioration, the control circuitry can notify the user by, for example; blurring, darkening or changing color of the electronic screen. As another example, the device can notify the user by displaying information on the screen, emitting sound from a speaker, vibrating, or a combination of any of the above, as well as storing the information in memory for further processing by the user or a third party.

In accordance with one aspect of the present invention there is provided a method for preventing sight deterioration caused by prolonged use of electronic visual displays in low-light conditions. The method comprises capturing, using a camera included in an electronic device, of an image containing a face of a user or at least a part of it; detecting, in the image, an area containing at least a part of said face; computing an illuminance in said area of the image; determining if the computed illuminance fulfills at least one criterion; and generating a control signal based on the at least one criterion fulfilled.

The step of determining if the computed illuminance fulfills at least one criterion may comprise finding a relation (for instance, by performing a comparison) between a predefined illuminance and the computed illuminance; such that the step of generating the control signal is performed according to said relation or comparison.

The method can further comprise a previous calibration process for determining a proportionality value k used in the computation of face illuminance.

In an embodiment, the calibration process comprises capturing, using the camera included in the electronic device, an image containing a face of a user or at least a part of it; detecting, in the image, an area containing at least a part of said face; computing a mean gray level of the pixels within said area of the image; measuring the illuminance arriving at the face of the user using a light sensor included in the electronic device; and determining the proportionality value k using the measured illuminance and the computed mean gray level of the pixels.

According to another embodiment, the calibration process comprises obtaining a type of skin of the face of the user; retrieving, from a skin reflectance database, a reflectance value associated to said type of skin; obtaining a calibration constant of the camera; and determining the proportionality value k using the reflectance value associated to said type of skin and the calibration constant of the camera. The calibration constant of the camera can be retrieved from a calibration constant database or, alternatively, can be determined from camera parameters including, but not limited to; exposure time, ISO sensitivity, F-number of the objective, physical size of an active pixel array in the digital image sensor.

In an embodiment, generating the control signal comprises notifying the user of an inadequate illuminance. For instance, said notifying can comprise, among other signals, any of the following (or any combination thereof):

Blurring at least a part of a screen of the electronic device.
Changing hue of at least a part of the screen of the electronic device.
Changing saturation of at least a part of the screen of the electronic device.
Changing brightness of at least a part of the screen of the electronic device.
Displaying a message on the screen of the electronic device.
Generating a sound in a speaker of the electronic device.
Generating a vibration in a vibration component of the electronic device.

The notifying of an inadequate illuminance can be performed when the illuminance, computed as a discrete value or as an average value computed over a certain period of time, falls outside of a predefined illuminance range. The notifying of an inadequate illuminance may be modulated based on a relation between the computed illuminance and the predefined illuminance.

In a further embodiment, generating the control signal may comprise storing the computed illuminance data in a storage of the electronic device.

In yet a further embodiment, the illuminance can be repeatedly computed over a certain time, t, and the control signal is generated using a combination rule of illuminance data collected over time; for instance, the control signal can be generated according to the time averaging of the illuminance in comparison with the predefined illuminance.

In accordance with a further aspect of the present invention there is provided a system for preventing sight deterioration caused by prolonged use of electronic visual displays in low-light conditions. The system comprises a camera, a processing circuitry and control circuitry that, in combination, performs the step of the method previously defined. In particular, the camera is configured to capture an image containing a face of a user or at least a part of it. The processing circuitry is configured for detecting an area containing at least a part of said face in the image; computing an illuminance of the detected area in the image; determining if the computed illuminance fulfills at least one criterion (e.g. finding or determining a relation or a comparison between a predefined illuminance and the computed illuminance); and generating a control signal according to the at least one criterion fulfilled (e.g. according to the relation or comparison). The control circuitry is configured for performing an action based on said control signal.

The system can further comprise a light sensor for improving the accuracy of measuring face illuminance, and wherein the processing circuitry is further configured for performing the calibration process previously defined.

According to an embodiment, the control circuitry is configured to notify the user of an inadequate illuminance. The control circuitry can be configured to modulate the notification of an inadequate illuminance based on a relation between the computed illuminance and the predefined illuminance.

The system may also comprise a storage configured to store data relating to the computed illuminance; and a communication circuitry configured to transmit the stored information to a network or another electronic device (e.g. a computer).

The present invention also refers to an electronic device comprising the system as previously defined. The electronic device can be, but is not limited to, one of the following: a mobile phone, a tablet, a smart television, a personal digital assistant, a laptop computer, a desktop computer, a stand-alone camera, a game console, a video-recorder, or a smart watch.

In accordance with yet a further aspect of the present invention there is provided a computer program product comprising computer-readable instructions stored thereon, that when executed by a processor of an electronic device, cause the processor to carry out a method previously defined.

BRIEF DESCRIPTION OF THE DRAWINGS

The following figures accompanying the detailed description below serve to further illustrate the nature of the present invention and its advantages.

DETAILED DESCRIPTION

Figure 1:
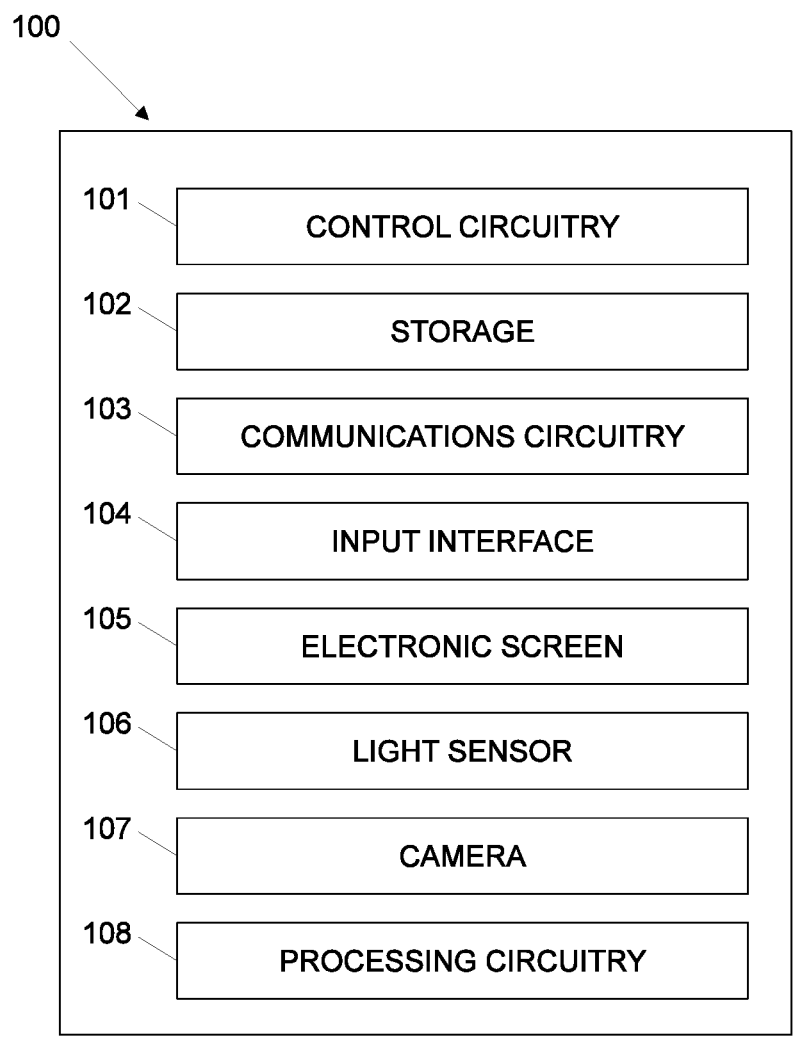
FIG. 1 is a block diagram of an illustrative electronic device for preventing sight deterioration caused by low-light conditions in accordance with one embodiment of the invention.

The present invention is directed to a system and method for preventing sight deterioration caused by a prolonged period of time watching the screen of an electronic device in low-light conditions. The electronic device itself can determine the illumination of the user's face using a user-facing (front) camera. If the measured illumination is lower than a certain value, which can put the user at risk of sight deterioration and progression of myopia, the user can be notified, or the illuminance value can be stored in memory for further processing by the user or a third party. For example, an electronic device can include a camera coupled to a processing circuitry for passive detection of a user's face. The processing circuitry can analyze images from a camera (i.e., single images or video frames) and determine if they contain an image of at least a part of a user's face (hereinafter referred to as "user's face"). Thereafter, the images that contain an area of a user's face can be analyzed to determine a mean gray level of the pixels in the image of the user's face. The mean gray level of the pixels in the sampled area is used to determine the mean illuminance of the sampled area, according to a known relationship which includes the F-number of the camera objective, exposure time, and the ISO sensitivity value of the digital image sensor of the camera. Equations of the general form shown in (1) below can be used to quantify this relationship.

$$E = \frac{k \cdot Y \cdot N^2}{t \cdot S} \quad (\text{Eq. 1})$$

where E is the mean illuminance of the sampled area of the face; Y is the mean gray level of the pixels in the sampled area of the image; N is the F-number, t is exposure time, S is the ISO sensitivity, and k is a proportionality value.

The proportionality value k in equation (1) depends on the reflectance of the user's face and the calibration constant of the camera (e.g. a gain applied by the control circuitry of the electronic device) and is determined by an initial calibration.

If the processing circuitry determines that the illuminance (E) of the user's face is lower than a threshold value ($E_0$) defined by a certain criterion, it can send a control signal to control circuitry to notify the user, or store the signal in memory for further processing by the user or a third party. If the processing circuitry determines that said illuminance value is equal or greater than a certain value, the control circuitry can stop notifications or not initiate them.

In some embodiments, the control circuitry of the device can notify the user when the processing circuitry determines that a certain quantification of light exposure accumulated over time meets a certain criterion, for example if the average of the illuminance (E) computed over a certain time, t, exceeds a certain threshold value.

Furthermore, in some embodiments the notification can be modulated by said time averaging of the illuminance (E) to indicate that the face illumination is either too low or approaching levels detrimental to ocular health. For example, the screen can be made progressively more blurred, or darker.

FIG. 1 is a schematic overview of an illustrative electronic device for preventing sight deterioration caused by spending large amounts of time under low-lighting conditions in accordance with one embodiment of the invention. The electronic device 100 can include control circuitry 101, storage 102, communications circuitry 103, input interface 104, electronic visual display or screen 105, light sensor 106, camera 107, and processing circuitry 108. In some embodiments, one or more of device's components can be combined or omitted. In some embodiments, electronic device 100 can include other components not included in FIG. 1, such as a vibration component, a loudspeaker, a microphone, an accelerometer, a gyroscope, or a combination of any of the aforementioned components.

The electronic device 100 can include any suitable type of device with an electronic screen and a camera used to determine the illumination of a user's face. In an embodiment, the electronic device 100 can also include a light sensor to be employed in a previous calibration process. For example, the electronic device 100 can include any of the following devices equipped with a camera and a light sensor: a mobile phone, a tablet, a "smart" television set, a personal digital assistant (PDA), a laptop or desktop computer, a stand-alone camera or video-recorder, and any other suitable device. The electronic device 100 is preferably, but not limited to, a portable device.

Control circuitry 101 can include any circuitry and processors designed to control the functions, operations and performance of an electronic device 100. Storage 102 can include one or more storage mediums, such as internal or external memory of any type, such as: HDD, SSD, RAM, ROM, EPROM, Flash EEPROM, flash memory card such as an SD (i.e. Secure Digital) card of CF (i.e. Compact Flash) card, or any other type of memory suitable for the electronic device 100. Communications circuitry 103 can include any circuitry suitable to connect a device to a communications network and transmit communications using any suitable protocol such as, for example, Wi-Fi (e.g., a 802.11 protocol), Bluetooth®, cellular protocol (e.g., GSM, GPRS, CDMA, EDGE, LTE), or any other communications protocol or any combination thereof. Input interface 104 can include any suitable mechanism for receiving inputs from a user, such as a touchscreen or a keyboard.

The screen 105 can include any suitable mechanism for displaying information to a user. In some embodiments, screen 105 can include screen control circuitry for controlling the brightness. Furthermore, the screen 105 can be electronically coupled with control circuitry 101 and other components within an electronic device 100, or any combination thereof.

The light sensor 106 can include one or more light sensing components. For example, it can include two light sensors—one on either side the device. As another example, it can include a wide-angle field-of-view light sensor. The camera 107 can be configured to measure light only in a narrow angle subtended by the user's face.

Figure 2:
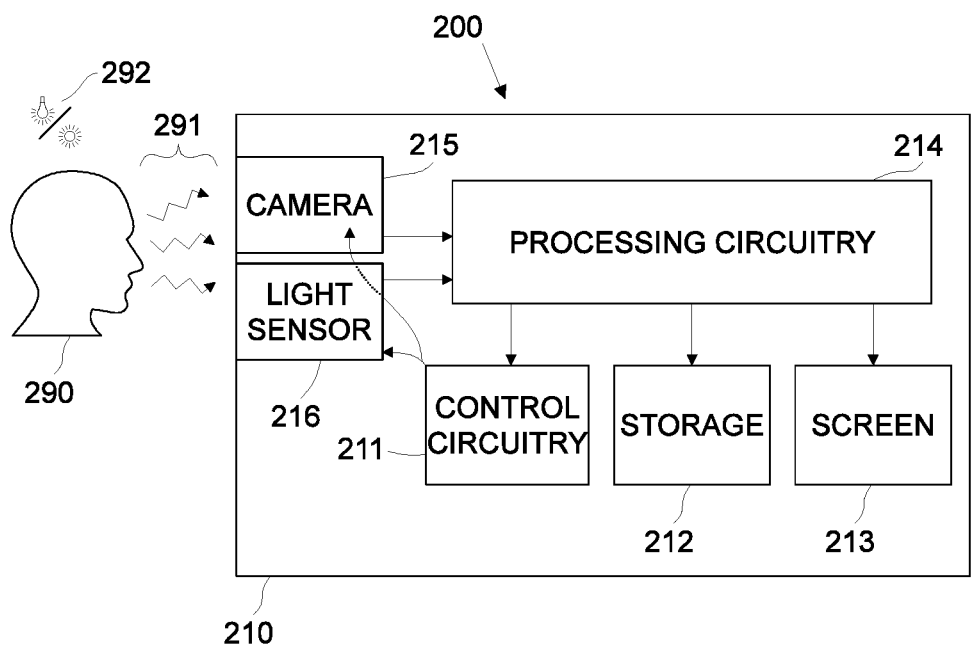
FIG. 2 is a schematic of an illustrative system for preventing sight deterioration in accordance with one embodiment of the invention where a camera is used to obtain an image of the user's face.

Processing circuitry 108 can include any type of data processing means, such as a processor or a micro-controller. As previously described, the processing circuitry 108 can determine that the illuminance (E) of the user's face is lower than a threshold value defined by a certain criterion ($E_0$), and then send a control signal to control circuitry 101 to notify the user, or store the signal in storage memory 102 for further processing by the user or a third party FIG. 2 is a schematic view of system 200 for preventing sight deterioration caused by low lighting conditions in accordance with one embodiment of the invention where a wide field-of-view light sensor and a camera are used to measure illuminance of the user's face in a previous calibration process. The system 200 can include an electronic device 210 that can include a light sensor 216 with a wide field-of-view, a camera 215 and processing circuitry 214 to detect a user's face 290 using ambient light 292 reflected diffusely 291 from it. Electronic device 210 can be very similar to electronic device 100 shown in FIG. 1 and share descriptions of components of the latter. For example, electronic device 210 can include control circuitry 211, storage 212, screen 213, and processing circuitry 214 that can be substantially similar to respective components of electronic device 100; control circuitry 101, storage 102, screen 105 and processing circuitry 108. Electronic device 210 can also include other suitable components such as communications circuitry 103, and input interface 104 shown in FIG. 1.

Processing circuitry 214 can use any suitable technique or combination of techniques for processing output images (i.e., single images or video frames) of a camera 215, detecting if they contain an image of a user's face 290, and computing illuminance of the user's face using a formula, e.g. Eq. 1. Furthermore, the processing circuitry 214 can determine if said face illuminance is lower than a predefined value, putting a user at risk of sight deterioration caused by low lighting conditions and myopia progression, or if a time averaging of the illuminance of the user's face meets a certain criterion.

For example, if illuminance of a user's face 290, determined by processing circuitry 214, doesn't meet a certain criterion, it can send a control signal to control circuitry 211. Control circuitry 211 can then perform a function based on said control signal. For example, control circuitry 211 can instruct screen 213 to show information to a user or to modify its operation (i.e., blur, darken or change a color of the screen). On the other hand, if illuminance of the user's face 290, determined by processing circuitry 214, doesn't meet said criterion, or if an image of a face is not detected by processing circuitry 214, it can send a control signal to control circuitry 211, which in turn can instruct the screen 213 to cease a modification of its operation. In some embodiments, said modification of operation of screen 213 can be substituted by a modification of operation of another component of a device 200, such as: strength of a vibration component; volume of sound emitted from a speaker; locally storing information relating to the computed illuminance into storage 212 for further processing or transmitting said information wirelessly or by a cable using communications circuitry 103, or any combination of any of the aforementioned modifications.

In some embodiments, the strength of this modification of operation of the screen 213 can be modulated by control circuitry 211 in response to a control signal from processing circuitry 214. For example, a screen can be made progressively more blurred, darker, or brighter as the ratio of an illuminance of the user's face and the predefined value becomes smaller.

In some embodiments, processing circuitry 214 can perform processing and analysis of consecutive frames (i.e., images in a video stream) in order to determine face illumination repeatedly over time, at a frame rate determined by the camera 215. In some embodiments the control circuitry 211 can modify the frame rate and/or exposure to improve performance. For example, the frame rate of processing and analysis performed by processing circuitry 214 can be modified by control circuitry 211 according to a user's input provided by an equivalent of input interface 104 in electronic device 210.

In some embodiments, processing circuitry 214 can, in order to have a more accurately measure of the illuminance of the user's face 290, take into account various parameters of the camera 215, and the digital image sensor, such as: physical dimensions of the sensor, camera image size; focal length of the camera's objective, F-number, ISO sensitivity, or any combination of any of the above. Furthermore, to the same end, processing circuitry 214 can make use of additional capabilities of camera 215, such as auto-focus or exposure control or others, or any combination of any of the above. For example, processing circuitry 214 can determine insufficient exposure of an image of a user's face 290 and send a control signal to control circuitry 211 to increase exposure of a camera 215.

In some embodiments, a user can calibrate the system 200 for preventing sight deterioration caused by low lighting conditions. For example, the user can be able to find the proportionality value k in the formula in Eq. 1. using a light sensor 216.

Figure 3:
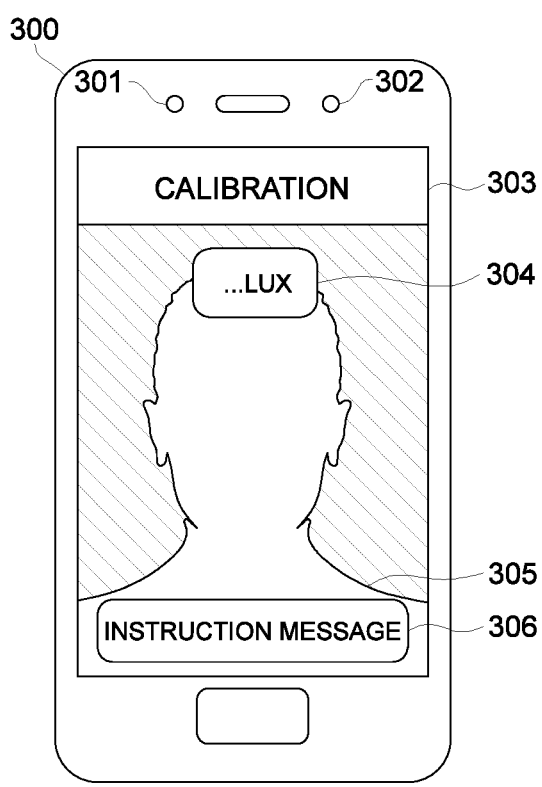
FIG. 3 is an example view of an illustrative screen of the calibration process of an electronic device to prevent sight deterioration in accordance with one embodiment of the invention.

FIG. 3 is an example view of an illustrative screen for calibrating an electronic device to prevent sight deterioration caused by low light conditions in accordance with one embodiment of the invention.

Device 300 can be an electronic device with a screen, a wide-angle field-of-view light sensor and a camera. Device 300 can be substantially similar to device 100 shown in FIG. 1 and device 210 shown in FIG. 2 and share the descriptions of components with any or all of the latter. For example, device 300 can include one or more light sensors 301 and one or more cameras 302 for capturing images of a user's face 290 (see light sensor 106 in FIG. 1, light sensor 216 in FIG. 2, camera 107 in FIG. 1, and camera 215 in FIG. 2). Device 300 can include a screen 303 (see screen 105 in FIG. 1 and screen 213 in FIG. 2 and any other suitable electronic device components or any combination thereof.

Electronic device 300 can show a calibration screen on screen 303 as part of the device's calibration process which can include calibration aids. In the example embodiment shown in FIG. 3, calibration aids can include a real-time preview of the user's face 305, an instruction message 306, a text area 304 or any combination of calibration aids.

As previously described, the user can calibrate the system to prevent sight deterioration caused by low lighting conditions. For example, in some embodiments the proportionality value k (Eq. 1.) can be found by inputting a known reference value of illuminance $E_c$ into the text area 304. As another example, the user can calibrate the system by means of finding a relation between the reference illuminance $E_c$ measured by a light sensor 301 situated at close proximity and at the level of the user's face, with the light sensor 301 capturing the light arriving at the user's face (i.e. the back of the electronic device 300 is facing the user's face), and the mean gray level of the pixels in an image of the face captured by camera 302 when the camera is placed at a certain distance in front of the user's face. The proportionality value k (Eq. 1) can be computed by the processing circuitry 108 using the following equation:

$$k = \frac{E_C \cdot t_C \cdot S_C}{Y_C \cdot N_C^2} \quad \text{(Eq. 2)}$$

where $Y_c$, $N_c$, $t_c$ and $S_c$ are, respectively, the mean gray level of the pixels in the image of the face, F-number, exposure time and ISO sensitivity used in the calibration.

Figure 4:
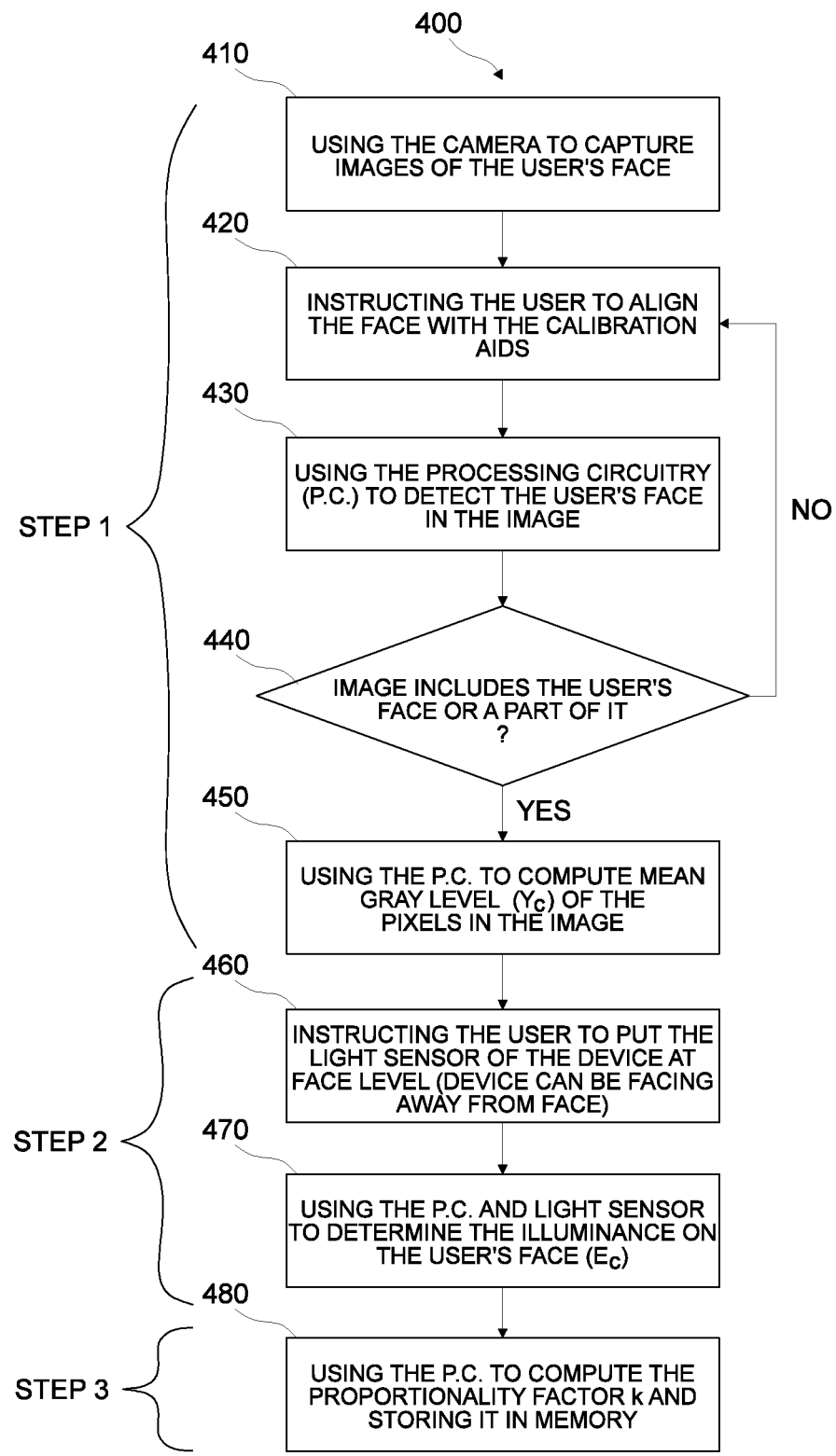
FIG. 4 is a flowchart illustrating the process of calibrating an electronic device to prevent sight deterioration in accordance with one embodiment of the invention.

FIG. 4 is a flowchart of an illustrative process 400 for calibrating an electronic device to prevent sight deterioration caused by low lighting conditions in accordance with one embodiment of the invention.

Calibration process 400 can be performed by an electronic device (100; 210) with a screen (105; 213) and one or more light sensors (106; 216; 301), and one or more cameras (107; 215; 302).

Calibration process 400 can consist of three steps. The first step relates to the use of the camera to compute illuminance reflected from the user's face (by analyzing the pixels of an image captured by the camera), whereas in the second step the light sensor is employed to determine the illuminance arriving at the user's face. The order in which first and second steps are executed may be exchanged (i.e. the second step may be performed prior to the first step). Finally, in the third step, the proportionality value k is computed using the data captured in the first and second steps.

This first step can begin with block 410, where a camera of the electronic device can be used to capture images of a user's face. Any suitable camera can be used to capture images at block 410 using light reflected from a user's face (see 291 in FIG. 2). At block 420, a user can be instructed to maintain an electronic device at a certain calibration distance and to maintain an image of the user's head aligned with calibration aids (see i.e., calibration aids 304 in FIG. 3). For example, a user can be instructed at block 420 by an instruction message (see, i.e., instruction message 306 in FIG. 3) to maintain the electronic device directed towards the user at a calibration distance of, for example 40 CM.

At block 430, the user's face or a part of it can be detected in an image from the camera. As previously described, any suitable technique or combination of techniques for processing output images (i.e., single images or video frames) of one or more cameras can be used by the processing circuitry (108; 214) for detecting at least an image of the user's face. Block 440 can serve as a decision node in process 400. For example, if the user's face is detected in block 430, process 400 can proceed with block 440. At block 450, the mean gray level of the pixels Y in the image of the user's face is determined by the processing circuitry and stored in memory (see, i.e., storage 102 in FIG. 1 and storage 212 in FIG. 2).

At block 460, which marks the beginning of the second step of the calibration process 400, the user is instructed to situate the light sensor (106; 216) of the electronic device at the level of the face, at close proximity to the face. For example, in one embodiment of the invention, a user can be instructed at block 460 by an instruction message (see, i.e., instruction message 306 in FIG. 3) to flip the electronic device so that it is situated at face level, in close proximity to the face, directed away from the face and towards the incoming light while remaining in the same position with the same lighting. At block 470 the light sensor is used to measure the illuminance $E_c$ arriving at the user's face.

In the third step, at block 480 the processing circuitry computes the proportionality value k from Eq. 2 using the illuminance $E_c$ measured in the second step with the light sensor 216 and the illuminance computed in the first step and store it in memory of the electronic device.

As previously described, an electronic system for preventing sight deterioration caused by prolonged periods of time in low lighting conditions can notify the user when the processing circuitry determines that the illuminance of the user's face is lower than a threshold value defined by a certain criterion.

Figure 5:
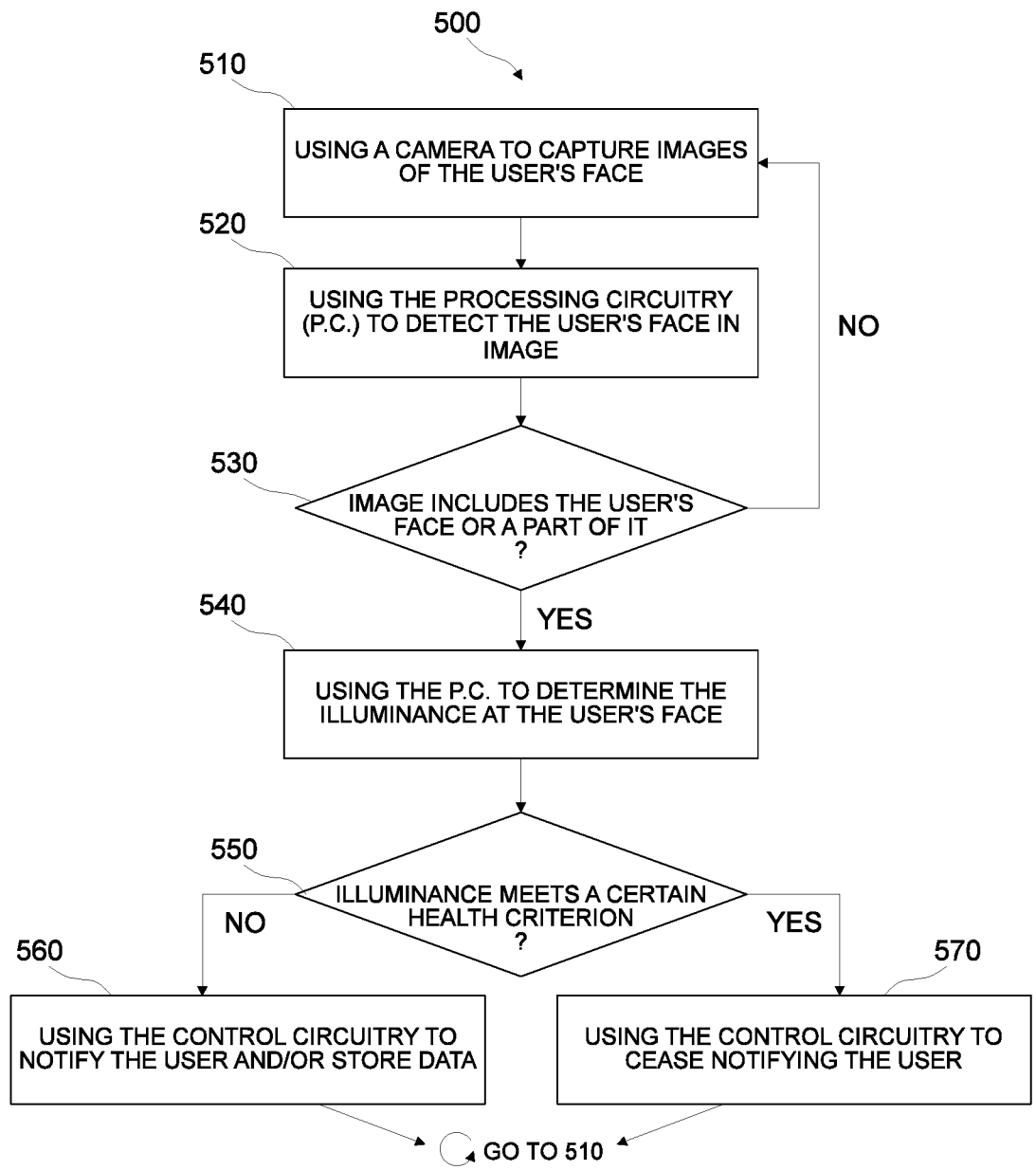
FIG. 5 is a flowchart illustrating the process for preventing sight deterioration in accordance with one embodiment of the invention.

FIG. 5 is a flowchart of illustrative process 500 for preventing sight deterioration caused by large amounts of time under low lighting conditions in accordance with one embodiment of the invention. Process 500 can be performed by an electronic device (corresponding to device 100 in FIG. 1 or device 210 in FIG. 2) with a screen (see, i.e., electronic screen 105 in FIG. 1 and screen 213 in FIG. 2) and a camera (see. i.e. 107 in FIGS. 1 and 215 in FIG. 2), and can include a wide-angle field-of-view light sensor (see, i.e., light sensor 106 in FIG. 1 and light sensor 216 in FIG. 2). In some embodiments, process 500 can be performed as a background process of the electronic device in a continuous loop.

Process 500 can begin with block 510. At block 510, a camera (see 215 in FIG. 2) can be used to capture images of a user's face. Any suitable camera can be used to capture images at block 510 using light reflected from a user's face (see 291 in FIG. 2). At block 520 the user's face or a part of it can be detected in an image from the camera by processing circuitry (see, i.e., processing circuitry 107 in FIG. 1 and processing circuitry 214 in FIG. 2). Block 530 can serve as a first decision node in process 500. For example, if the user's face or part of it is detected in block 520, process 500 can proceed with block 540. On the other hand, if the user's face or part of it is not detected, process 500 can return to block 510.

At block 540 the illuminance of the user's face can be computed by processing circuitry from an image from a camera. As previously described, any suitable technique or combination of techniques for processing output images (i.e., single images or video frames) can be used by processing circuitry for detecting whether they contain an image of a user's face, and for computing the illuminance of the user's face from Eq. 1.

Block 550 can serve as a second decision node in process 500. For example, if the illuminance E of a user's face is lower than a predefined value $E_0$, ($E<E_0$), at block 560 the processing circuitry can send, a control signal to control circuitry (see, i.e., control circuitry 101 in FIG. 1 and control circuitry 211 in FIG. 2) to notify the user and/or store data related to the illuminance measured at the user's face in memory. On the other hand, if illumination of user's face is greater or equal than said predefined value ($E \geq E_0$), the processing circuitry can send a control signal to control circuitry to stop notifying a user at block 570.

As previously described, process 500 can be performed as a background process of a device in a continuous loop. In such case, after ending with block 560 or block 570, process 500 can return to block 510.

As previously described, processing circuitry (see, i.e., processing circuitry 107 in FIG. 1 and processing circuitry 214 in FIG. 2) of the electronic device can make use of additional capabilities of a camera, such as auto-focus or exposure control or others, or any combination of any of the above in order to improve performance of detection of a user's face in an image of a camera at block 520 of process 500. For example, any suitable processing circuitry can determine insufficient exposure of an image of a user's face and send a control signal to control circuitry (see, i.e., control circuitry 101 in FIG. 1 and control circuitry 211 in FIG. 2) to increase exposure of a camera (see, i.e., camera 215 in FIG. 2).

Figure 6:
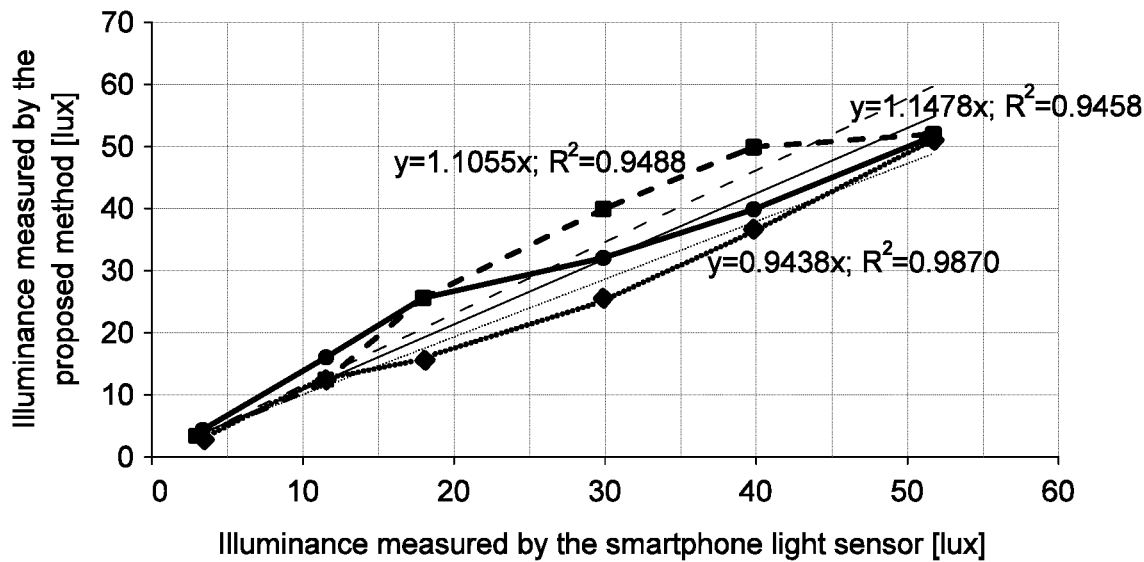
FIG. 6 is an example of the application of the invention.

FIG. 6 shows an example of the application of the invention in the measurement of the illuminance of three user's faces. In particular, FIG. 6. Depicts an example of illuminance measurements obtained in process 500 in a group of three subjects of different ethnicities: Caucasian (solid), Asian (dotted) and African (dashed), characterized by different values of skin reflectance.

Under the same lightning conditions, the mean gray level of the pixels Y obtained in the Caucasian subject was 1.15 times larger than the Asian subject, and 2.8 times larger than the African subject due to the differences in the reflectance of their skin. The proportionality value, kin Eq. 2, corrects the illuminance value for said difference allowing a more accurate measurement of the user's face's illuminance independently of the skin's reflectance.

As described previously, the proportionality value k depends on the reflectance of the user's face and a calibration constant of the camera, which in turn depends on a gain applied by the control circuitry of the electronic device. Taking into account that the differences in reflectances of different types of skin (e.g. Caucasian, Asian, African) can be roughly estimated, as shown in the graph in FIG. 6, the calibration process 400 to determine the proportionality value k can be performed in a simplified way (without the use of a light sensor), by prompting the user to input the type of his/her skin manually at the calibration screen. Since the calibration constant of the camera can be calculated from known camera parameters and the gain applied by the control circuitry of the electronic device, the proportionality value k may be estimated from the reflectance of the skin.

Figure 7:
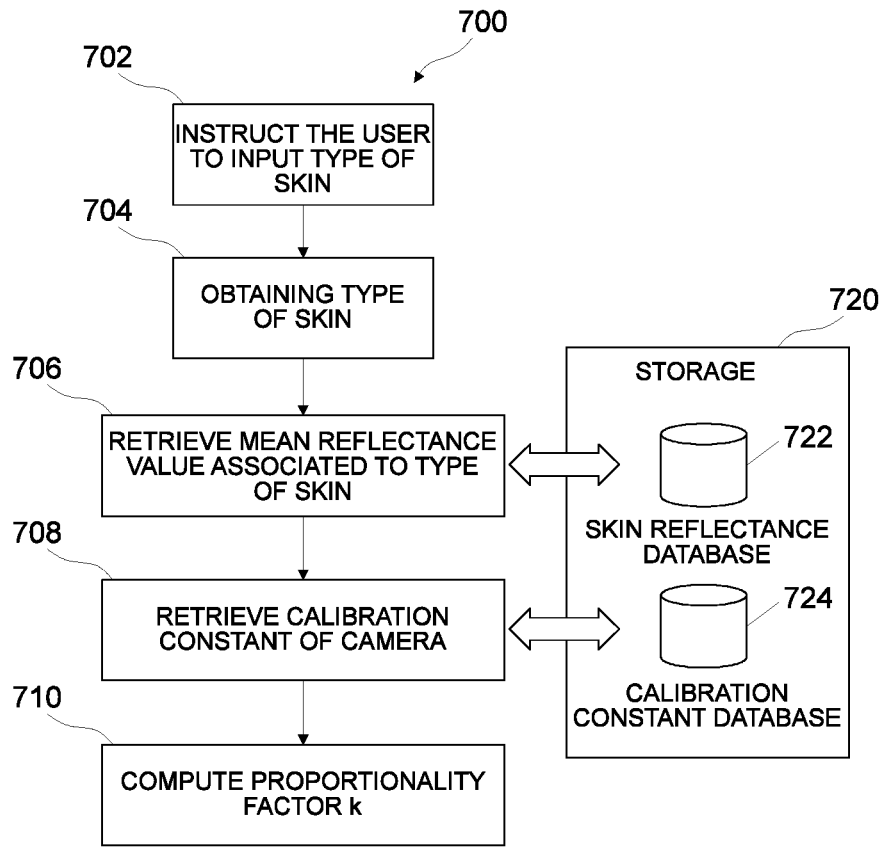
FIG. 7 is a flowchart illustrating the calibration process in accordance with another embodiment of the invention.

FIG. 7 is a flowchart of an illustrative, simplified calibration process 700 for calibrating an electronic device to prevent sight deterioration caused by low lighting conditions in accordance with one embodiment of the invention.

Calibration process 700 can be performed by an electronic device (100; 210) with a screen (105; 213), and one or more cameras (107; 215; 302).

Process 700 can start at block 702, where the user can be prompted to input the type of his/her skin manually. For example, the user may select the type of skin from a list of options including, but not limited to, the type of skin associated with race (Caucasian, Asian, African, etc.), or the skin tone (dark black, mild black, white, etc.). The process can then access a skin reflectance database 722 at block 706, and retrieve a reflectance value associated with the chosen type of skin 704. Subsequently, at block 708, the calibration constant of the camera is retrieved from a calibration constant database 724.

The database can be included in storage memory 102, 212, 720 of the electronic device or, alternatively, it can be located on a remote server and accessed wirelessly or by a cable by the electronic device. Finally, at block 710 the proportionality value k can be estimated. Although more imprecise, this calibration process avoids the need for a light sensor and simplifies the calibration process shown in FIG. 4.

The invention claimed is:

1. A method for preventing sight deterioration caused by prolonged use of electronic visual displays in low-light conditions, the method comprising:
    capturing, using a camera included in an electronic device, an image containing a face of a user or at least a part of the face of the user;
    detecting, in the image, a sampled area containing at least a part of said face;
    computing a mean illuminance of the sampled area of the face according to the following equation:

$$E = \frac{k \cdot Y \cdot N^2}{t \cdot S}$$

wherein
    E is a mean illuminance of the sampled area of the face,
    Y is a mean gray level of the pixels in the sampled area of the image,
    N is an F-number of the objective of the camera,
    t is an exposure time,
    S is an ISO sensitivity value of the digital image sensor of the camera, and
    k is a proportionality value previously obtained in a calibration process;
    determining if the computed illuminance fulfills at least one criterion; and
    generating a control signal according to the at least one criterion fulfilled; and performing an action, through a control circuitry, based on said control signal.

2. The method of claim 1, wherein the step of determining if the computed illuminance fulfills at least one criterion comprises finding a relation between a predefined illuminance and the computed illuminance; and wherein generating the control signal is performed according to said relation.

3. The method of claim 1, further comprising a calibration process for determining the proportionality value k used in the computation of face illuminance.

4. The method of claim 3, wherein the calibration process comprises:
    capturing, using the camera included in the electronic device, an image containing a face of a user or at least a part of the face of the user;
    detecting, in the image, an area containing at least a part of said face;
    computing a mean gray level of the pixels ($Y_c$) within said area of the image;
    measuring a illuminance ($E_c$) arriving at the face of the user using a light sensor included in the electronic device; and
    determining the proportionality value k using the measured illuminance ($E_c$) and the computed mean gray level of the pixels ($Y_c$).

5. The method of claim 3, wherein the calibration process comprises:
    obtaining a type of skin of the face of the user;
    retrieving, from a skin reflectance database, a reflectance value associated to said type of skin;
    obtaining a calibration constant of the camera; and
    determining the proportionality value k using the reflectance value associated to said type of skin and the calibration constant of the camera.

6. The method of claim 5, wherein the calibration constant of the camera is retrieved from a calibration constant database.

7. The method of claim 5, wherein the calibration constant of the camera is determined from camera parameters including, but not limited to; exposure time, ISO sensitivity, F-number of the objective, physical size of an active pixel array in the digital image sensor.

8. The method of claim 1, wherein generating the control signal comprises notifying the user of an inadequate illuminance.

9. The method of claim 8, wherein said notifying the user of an inadequate illuminance comprises any of the following:
    blurring at least a part of a screen of the electronic device;
    changing hue of at least a part of the screen of the electronic device;
    changing saturation of at least a part of the screen of the electronic device;
    changing brightness of at least a part of the screen of the electronic device;

displaying a message on the screen of the electronic device;
generating a sound in a speaker of the electronic device;
generating a vibration in a vibration component of the electronic device; or
any combination thereof.

10. The method of claim 8, wherein said notifying the user of an inadequate illuminance is performed when the illuminance, computed as a discrete value or as an average value computed over a certain period of time, falls outside of a predefined illuminance range.

11. The method of claim 8, wherein said notifying the user of an inadequate illuminance is modulated based on a relation between the computed illuminance and the predefined illuminance.

12. The method of claim 1, wherein generating the control signal comprises storing the computed illuminance data in a storage of the electronic device.

13. The method of claim 1, wherein the illuminance is repeatedly computed over a certain time, t, and the control signal is generated using a combination rule of illuminance data collected over time.

14. A system for preventing sight deterioration caused by prolonged use of electronic visual displays in low-light conditions, the system comprising:
a camera configured to capture an image containing a face of a user or at least a part of it;
a processing circuitry configured for:
detecting an area containing at least a part of said face in the image;
computing a mean illuminance of the sampled area of the face according to the following equation:

$$E = \frac{k \cdot Y \cdot N^2}{t \cdot S}$$

wherein E is a mean illuminance of the sampled area of the face, Y is a mean gray level of the pixels in the sampled area of the image, N is an F-number of the objective of the camera, t is an exposure time, S is an ISO sensitivity value of the digital image sensor of the camera, and k is a proportionality value previously obtained in a calibration process;
determining if the computed illuminance fulfills at least one criterion;
generating a control signal according to the at least one criterion fulfilled; and
control circuitry configured for performing an action based on said control signal.

15. The system according to claim 14, further comprising a light sensor and wherein the processing circuitry is further configured for performing a calibration process.

16. The system according to claim 14, wherein the control circuitry is configured to notify the user of an inadequate illuminance.

17. The system according to claim 16, wherein the control circuitry is configured to modulate the notification of an inadequate illuminance based on a relation between the computed illuminance and the predefined illuminance.

18. The system according to claim 14, further comprising:
a storage configured to store data relating to the computed illuminance; and
a communication circuitry configured to transmit the stored information to a network.

19. An electronic device comprising the system according to claim 14, wherein the electronic device is one of the following:
a mobile phone;
a tablet;
a smart television;
a personal digital assistant;
a laptop computer;
a desktop computer;
a stand-alone camera;
a game console;
a video-recorder; or
a smart watch.

20. A computer program product comprising non-transitory computer-readable medium having recorded thereon computer code instructions that, when executed by a processor of an electronic device, cause the processor to perform the method according to claim 1.

* * * * *